US012785538B2

(12) United States Patent
Cheng

(10) Patent No.: US 12,785,538 B2
(45) Date of Patent: Nov. 3, 2026

(54) MULTIPHASE POWER CONVERTER AND CONTROL CIRCUIT, CONTROL METHOD THEREOF

(71) Applicant: Joulwatt Technology Co., Ltd., Hangzhou (CN)

(72) Inventor: Yang Cheng, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 175 days.

(21) Appl. No.: 18/829,625

(22) Filed: Sep. 10, 2024

(65) Prior Publication Data

US 2025/0105721 A1 Mar. 27, 2025

(30) Foreign Application Priority Data

Sep. 26, 2023 (CN) ........................ 202311249605.X

(51) Int. Cl.
*H02M 1/00* (2007.01)
*H02M 3/158* (2006.01)

(52) U.S. Cl.
CPC ....... *H02M 1/0043* (2021.05); *H02M 1/0009* (2021.05); *H02M 3/1586* (2021.05)

(58) Field of Classification Search
CPC . H02M 1/0043; H02M 1/0009; H02M 3/1586
See application file for complete search history.

(56) References Cited

U.S. PATENT DOCUMENTS

2011/0169471 A1* 7/2011 Nagasawa ........... H02M 3/1584 323/283
2021/0028686 A1* 1/2021 Jiang ................... H02M 3/1584
2021/0376731 A1* 12/2021 Bayer ................. H02M 3/1586
2022/0038008 A1* 2/2022 Wu ........................ H02M 1/088
2022/0247316 A1* 8/2022 Jiang ................... H02M 3/1584
2023/0238875 A1 7/2023 Yang et al.

FOREIGN PATENT DOCUMENTS

CN 101527509 A 9/2009
CN 102447390 A 5/2012
CN 207601159 U 7/2018
CN 110445381 A 11/2019
CN 112865499 A 5/2021
CN 115149804 A 10/2022
CN 115250055 A 10/2022

* cited by examiner

*Primary Examiner* — Lakaisha Jackson
(74) *Attorney, Agent, or Firm* — IPro, PLLC

(57) ABSTRACT

A control circuit generates a set signal based on an output voltage and a reference voltage signal, a total output current and a reference current signal, and each sub-control circuit receives the set signal; a next sub-control circuit receives an enable signal generated by its previous sub-control circuit, and generates a corresponding switch control signal and an enable signal acting on its next sub-control circuit to control the corresponding switch circuit to turn on or turn off based on the received enable signal and the set signal. The present disclosure can control sequential conduction of the plurality of switch circuits through the signal transmission among the multiple sub-control circuits, and can implement overcurrent protection when the total output current is overcurrent, and implement the control of the switch circuit when the total output current is not overcurrent based on the comparison of the output voltage and the reference voltage signal.

13 Claims, 6 Drawing Sheets

MULTIPHASE POWER CONVERTER AND CONTROL CIRCUIT, CONTROL METHOD THEREOF

CROSS-REFERENCE TO RELATED APPLICATIONS

This present disclosure claims priority to a Chinese patent application No. 202311249605X, filed on Sep. 26, 2023, and entitled "multiphase power converter and control circuit, control method thereof", the entire contents of which are incorporated herein by reference, including the specification, claims, drawings and abstract.

FIELD OF TECHNOLOGY

The present disclosure relates to the field of power converter, more particularly, to a multiphase power converter and the control circuit, control method thereof.

BACKGROUND

The multiphase power converter includes a plurality of switch circuits, connecting the output terminals of the multiple switch circuits together as an output, and providing energy to the load by controlling the plurality of switch circuits to turn on alternatively; the parallel connection of the plurality of switch circuits can output high currents to meet the demand for high currents, e.g., processors. Due to the large output current of multiphase power converters and the high requirements for output voltage, it is necessary to design corresponding circuits to ensure the safety and stable operation of the system.

SUMMARY

In order to resolve the above technical problem, the present disclosure provides a multiphase power converter and a control circuit, control method thereof, to solve the problems in the prior art.

According to a first aspect of the present disclosure, there is provided a control circuit of a multiphase power converter, and the multiphase power converter comprises a plurality of switch circuits, and output terminals of the plurality of switch circuits are connected together to provide output voltage, wherein the control circuit comprises:

- a set signal generation circuit, generating a control signal based on the output voltage and the reference voltage signal; generating a current control signal based on the total output current and the reference current signal of the plurality of switch circuits; and generating a set signal based on the voltage control signal and the current control signal;
- a plurality of sub-control circuits, the plurality of sub-control circuits receives the set signal;
- an enable terminal of the next sub-control circuit receives the enable signal generated by the previous sub-control signal, and generates an enable signal for the enable terminal of the next sub-control circuit based on the enable signal and the set signal;
- each sub-control circuit generates the corresponding switch control signal based on the received enable signal and the set signal, to control the corresponding switch circuit to turn on or off.

Optionally, when the sub-control circuit receives a valid enable signal and a valid set signal, it controls the switch circuit corresponding to the sub-control circuit to turn on; otherwise, control the switch circuit corresponding to the sub-control circuit to remain turned off.

Optionally, the control circuit further comprises a first enable signal generation circuit, which generates a first enable signal for the enable terminal of the first sub-control circuit, enabling the first sub-control circuit for the first time based on the power on pulse or a signal generated based on the power on pulse.

Optionally, the control circuit further comprises an enable selection circuit, which receives a phase instruction signal representing the number m of sub-control circuits or switch circuits that need to be operated, where m is a positive integer greater than or equal to 1; the phase instruction signal is generated by the control circuit based on the magnitude of the load current;

- the enable selection circuit receives second enable signals . . . n+1th enable signals generated by the first sub-control circuit . . . the nth sub-control circuit, respectively; wherein, the nth sub-control circuit is the last sub-control circuit, where n is a positive integer greater than or equal to 2;
- based on the phase instruction signal, the enable selection circuit selects the m+1th enable signal generated by the mth sub-control circuit to act on the input terminal of the first enable signal generation circuit, generating the first enable signal that enables the kth sub-control circuit; wherein, k is a positive integer not equal to 1, and m is a positive integer greater than or equal to 1;
- the control circuit controls the sub-control circuits or corresponding switch circuits other than the 1st to m sub-control circuits to not work.

Optionally, the last sub-control circuit generates an enable signal for the input terminal of the first enable signal generation circuit based on the set signal and the enable signal generated by the previous sub-control circuit; the first enable signal generation circuit generates an enable signal for the kth enable of the first sub-control circuit based on the effective enable signal; wherein k is a positive integer not equal to 1.

Optionally, when each sub-control circuit generates an effective enable signal and the corresponding enable signal is not a short pulse signal, the next sub-control circuit generates a reset enable signal for the reset enable terminal of its previous sub-control circuit based on the enable signal and the set signal generated by its previous sub-control circuit; the previous sub-control circuit resets the enable signal generated by the previous sub-control circuit based on the received effective reset enable signal;

- the first enable signal generation circuit also receives the second enable signal generated by the first sub-control circuit; when the first enable signal generation circuit receives a valid second enable signal, it resets the first enable signal generated for the first time;
- the reset enable terminal of the last sub-control circuit receives the reset enable signal generated by the first sub-control circuit; when the last sub-control circuit receives a valid reset enable signal, reset the kth generated first enable signal.

Optionally, the control circuit further comprises plurality of overcurrent detection circuits, each of which detects whether the corresponding switch circuit is overcurrent based on the current detection signal flowing through the corresponding switch circuit;

- each sub-control circuit is respectively coupled to the output terminal of the corresponding overcurrent detection circuit; when overcurrent is detected in the corresponding switch circuit, the corresponding switch circuit is controlled to remain turned off.

Optionally, the current sub-control circuit generates an enable signal for its next sub-control circuit based on the effective enable signal it receives and the current pulse of the set signal;

the next sub-control circuit of the current sub-control circuit generates an enable signal for its next sub-control circuit based on the received effective enable signal and the next pulse of the set signal.

Optionally, the plurality of sub-control circuits comprise a conduction time control circuit, which is used to control the conduction duration of the corresponding switch control circuit.

The present disclosure further provides a multiphase power converter, wherein it comprises the control circuit described above.

The present disclosure further provides a control method of multiphase power converter, the multiphase power converter comprises plurality of switch circuits; output terminals of the plurality of switch circuits are connected together to provide the output voltage, wherein the control method comprises:

generating a voltage control signal based on the output voltage and reference voltage signal; generating a current control signal based on the total output current of the multiple switch circuits and the reference current signal; and generating a set signal based on the voltage control signal and the current control signal;

the plurality of sub-control circuits receive the set signal;

the enable terminal of the next sub-control circuit receives the enable signal generated by the previous sub-control circuit, and generates an enable signal for the enable terminal of the next sub-control circuit based on the enable signal and the set signal;

each sub-control circuit generates a corresponding switch control signal based on the received enable signal and the set signal, to control the corresponding switch circuit to turn on or off.

Optionally, when the sub-control circuit receives a valid enable signal and a valid set signal, it controls the switch circuit corresponding to the sub-control circuit to turn on; otherwise, the switch circuit corresponding to the sub-control circuit is controlled to remain turned off.

Optionally, based on the power on pulse or the signal generated based on the power on pulse, the first enable signal generation circuit generates a first enable signal for the enable terminal of the first sub-control circuit, enabling the first sub-control circuit to enable for the first time.

Optionally, the control circuit further comprises an enable selection circuit, which receives a phase instruction signal representing the number m of the sub-control circuits or switch circuits that need to operate, where m is a positive integer greater than or equal to 1; the phase instruction signal is generated by the control circuit based on the magnitude of the load current;

the enable selection circuit receives the second enable signal . . . n+1th enable signal generated by the first sub-control circuit . . . the nth sub-control circuit, respectively; wherein, the nth sub-control circuit is the last sub-control circuit, where n is a positive integer greater than or equal to 2;

based on the phase instruction signal, the enable selection circuit selects the m+1th enable signal generated by the mth sub-control circuit to act on the input terminal of the first enable signal generation circuit, generates the first enable signal that enables the kth sub-control circuit; wherein, k is a positive integer not equal to 1, and m is a positive integer greater than or equal to 1;

the control circuit controls the sub-control circuits or corresponding switch circuits other than the 1st to mth sub-control circuits to not work.

Optionally, the current sub-control circuit generates an enable signal for its next sub-control circuit based on the effective enable signal it receives and the current pulse of the set signal;

the next sub-control circuit of the current sub-control circuit generates an enable signal for its next sub-control circuit based on the received effective enable signal and the next pulse of the set signal.

The advantageous effects of the present disclosure at least include:

As described above, the control circuit and control method of the multiphase power converter provided by the present disclosure generate a set signal based on the output voltage and reference voltage signal, the total output current, and the reference current signal. Each sub-control circuit receives the set signal; the next sub-control circuit receives the enable signal generated by its previous sub-control circuit, and generates corresponding switch control signals based on the received enable signal and set signal, as well as the enable signal applied to its next sub-control circuit, to control the corresponding switch circuit to turn on or off. The present disclosure achieves sequential conduction control of multiple switch circuits through signal transmission among multiple sub-control circuits. When the total output current exceeds the current limit, overcurrent protection can be implemented. When the total output current does not exceed the current limit, control of the switch circuit can be achieved based on the ratio of the output voltage to the reference voltage signal, thus increasing system stability.

Further, the present disclosure also sets an enable selection circuit which, based on the phase number instruction signal, controls the number of the sub-control circuits or switch circuits which are operating according to the load condition, thus increasing control flexibility.

Further, when plurality of overcurrent detection circuits are set simultaneously, the plurality of overcurrent detection circuits correspond one-to-one with the plurality of switch circuits; when overcurrent is detected in the corresponding switch circuit, control the corresponding switch circuit to remain turned off. The present disclosure further improves the system reliability by setting an overcurrent detection circuit for each switch circuit in this way.

It should be noted that the above general description and the later detailed description are merely exemplary and illustrative, rather than restricting the present disclosure.

DETAILED DESCRIPTION

In order to facilitate the understanding of the present disclosure, a more comprehensive description of the present disclosure will be provided below with reference to the relevant accompanying drawings. The preferred embodiments of the present disclosure are shown in the accompanying drawings. However, the present disclosure can be implemented in different forms and is not limited to the embodiments described herein. On the contrary, these embodiments are provided to make the understanding of the disclosed content of the present disclosure more thorough and comprehensive.

Figure 1:
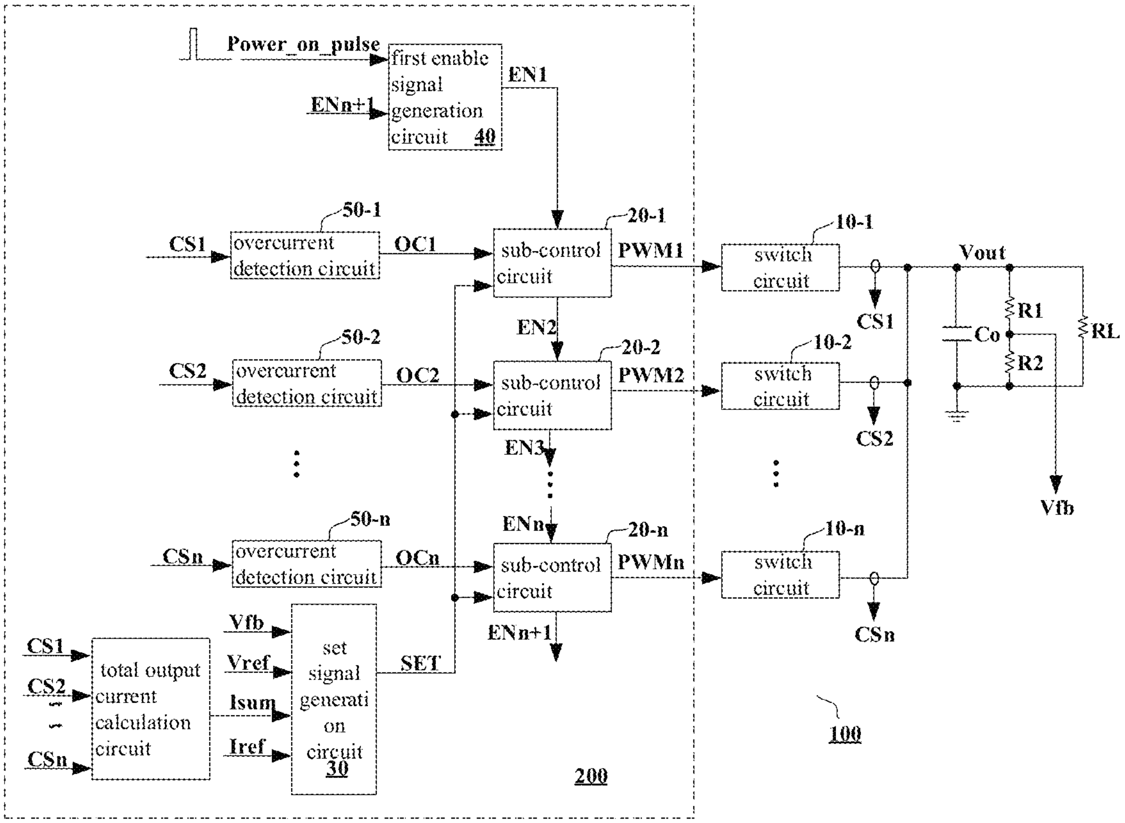
FIG. 1 shows a principle diagram of a multiphase power converter and the control circuit thereof provided by the present disclosure.

As shown in FIG. 1, it is a principle diagram of a multiphase power converter and its control circuit provided by the present disclosure. The multiphase power converter comprises plurality of switch circuits 10-1, 10-2 . . . 10-*n*; wherein, the switch circuit can be a step-down switch circuit, a step-up switch circuit, or other types of switch circuits; the control circuit 200 comprises plurality of sub-control circuits 20-1, 20-2, . . . 20-*n*; wherein, n can be a positive integer greater than or equal to 2. The plurality of sub-control circuits correspond to the plurality of switch circuits one-to-one, and each sub-control circuit outputs corresponding switch control signals PWM1, PWM2 . . . PWMn to control the corresponding switch circuit to turn on or off; the control circuit controls the plurality of sub-control circuits to enable subsequently, so as to control plurality of switch circuits to turn on sequentially. The control circuit comprises a set signal generation circuit 30, and its input terminal receives a signal Vfb representing the output voltage Vout, a reference voltage signal Vref, a total output current Isum, and a reference current signal Iref. The set signal generation circuit 30 generates a set signal SET based on these four input signals; the plurality of sub-control circuits receive the set signal SET. For those skilled in the art, it is known that in the multiphase power converter, the set signal is a high-frequency pulse signal. In addition, FIG. 1 illustrates that an output capacitor C0 and a load RL are set at the output terminal.

The following describes the signal transmission between sub-control circuits, take sub-control circuit 20-1 as the first sub-control circuit, sub-control circuit 20-2 as the second sub-control circuit, and sub-control circuit 20-*n* as the last sub-control circuit. Control circuit 200 comprises a first enable signal generation circuit 40, which can generate a power on pulse Power_on_pulse by a pulse generation circuit after the system is powered on. The circuit that generates this pulse can use conventional circuits in existing technology; the power on pulse Power_on-pulse or the signal generated based on the power on pulse is applied to the input terminal of the first enable signal generation circuit 40, which generates the first enable signal EN1 applied to the enable terminal of the first sub-control circuit based on the power on pulse Power_on-pulse or the signal generated based on the power on pulse; when the first sub-control circuit receives a valid first enable signal EN1 and a current valid set signal SET, it generates a second enable signal EN2 to act on the enable terminal of the second sub-control circuit. After receiving the valid second enable signal EN2 and the next valid set signal SET, the second sub-control circuit generates a third enable signal EN3 to act on the enable terminal of the third sub-control circuit, and so on, until the last sub-control circuit receives the valid enable signal ENn and the valid set signal SET, and then generates an enable signal ENn+1 to act on the first enable signal generation circuit 40. Based on the enable signal ENn+1, the first enable signal generation circuit 40 generates the first enable signal EN1 to enable the first sub-control circuit again, and so on, that is, controlling plurality of sub-control circuits to turn on sequentially. Wherein, the enable signals EN1, EN2 . . . ENn+1 can be similar to the power on pulse Power_on_pulse, which is a short pulse signal. Based on the principle in FIG. 4, those skilled in the art can combine specific circuit structures to implement, and the specific implementation circuit will not be listed in detail here.

Figure 2:
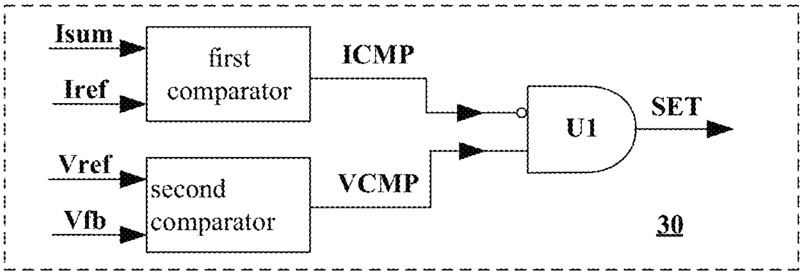
FIG. 2 shows a principle diagram of a set signal generation circuit provided by the present disclosure.

FIG. 2 shows a schematic diagram of a set signal generation circuit 30 provided by the present disclosure; as illustrated, it comprises a first comparator and a second comparator, wherein the two input terminals of the first comparator receive the total output current Isum and the reference current signal Iref, respectively. The first comparator outputs a current comparison signal ICMP based on the total output current Isum and the reference current signal Iref; the two input terminals of the second comparator receive a signal Vfb representing the output voltage Vout and a reference voltage signal Vref, respectively. The second comparator outputs a voltage comparison signal VMP based on the signal Vfb representing the output voltage Vout and the reference voltage signal Vref, wherein Vfb is obtained by dividing the output voltage Vout through resistors R1 and R2; as shown in FIG. 2, when the total output current Isum is greater than the reference current signal Iref, take the high level of the current comparison signal ICMP as an example for explanation; the current comparison signal ICMP is inverted and applied to an input terminal of the AND gate circuit U1, while the voltage comparison signal VCMP is applied to the other input terminal of the AND gate circuit U1. The AND gate circuit U1 generates a set signal SET based on the current comparison signal ICMP and the voltage comparison signal VCMP. When the total output current Isum is greater than the reference current signal Iref, which means that the total output current is overcurrent, the current comparison signal ICMP is in high level. At this time, regardless of whether the voltage comparison signal VCMP is high or low, the set signal SET is low; when the total output current Isum is less than the reference current signal Iref, the set signal SET determines the level of the set signal based on the voltage comparison signal VCMP. In addition, as other embodiments of the present disclosure, overcurrent can also be indicated when the current comparison signal ICMP is in a low level. At this time, the circuit can be transformed accordingly.

Furthermore, as shown in FIG. 1, the control circuit can also be equipped with overcurrent detection circuits 50-1, 50-2 . . . 50-n, corresponding to n switch circuits, and n overcurrent detection circuits are set, corresponding to the plurality of switch circuits one to one. Each overcurrent detection circuit detects whether the corresponding switch circuit is overcurrent based on the current detection signal flowing through the corresponding switch current; as shown in FIG. 1, the current detection signal for detecting the current flowing through the first switch circuit 10-1 is CS1, the current detection signal for detecting the current flowing through the second switch circuit 10-2 is CS2, and so on, and the current detection signal for detecting the current flowing through the nth switch circuit 10-n is CSn. Wherein, FIG. 1 only illustrates one way of detecting current signals CS1, CS2 . . . CSn, and the present disclosure is not limited to this. As long as it can detect the current flowing through the switch circuit, other variations are also within the protection scope of the present disclosure. The plurality of overcurrent detection circuits output overcurrent detection signals OC1, OC2 . . . OCn based on current detection signals CS1, CS2 . . . CSn, respectively. The overcurrent detection signals OC1, OC2 . . . OCn indicate whether the current flowing through the corresponding switch circuit is overcurrent. As one embodiment of the present disclosure, the overcurrent detection signals OC1, OC2 . . . OCn are used to indicate that the current flowing through the corresponding switch circuit is overcurrent when they are in high level, and correspondingly, when they are in low level, it indicates that the current flowing through the corresponding switch circuit is not overcurrent. The overcurrent detection signals OC1, OC2 . . . OCn are respectively used as input signals for the corresponding sub-control circuits, so the corresponding sub-control circuits also generate corresponding switch control signals based on the corresponding overcurrent detection signals. When overcurrent is detected in the corresponding switch circuit, the circuit of the corresponding switch is controlled to turn off through the corresponding sub-control circuit. The present disclosure is not limited to this. In other embodiments of the present disclosure, the overcurrent detection signal can also be used as a low level to indicate the overcurrent of the corresponding switch circuit.

Figure 3:
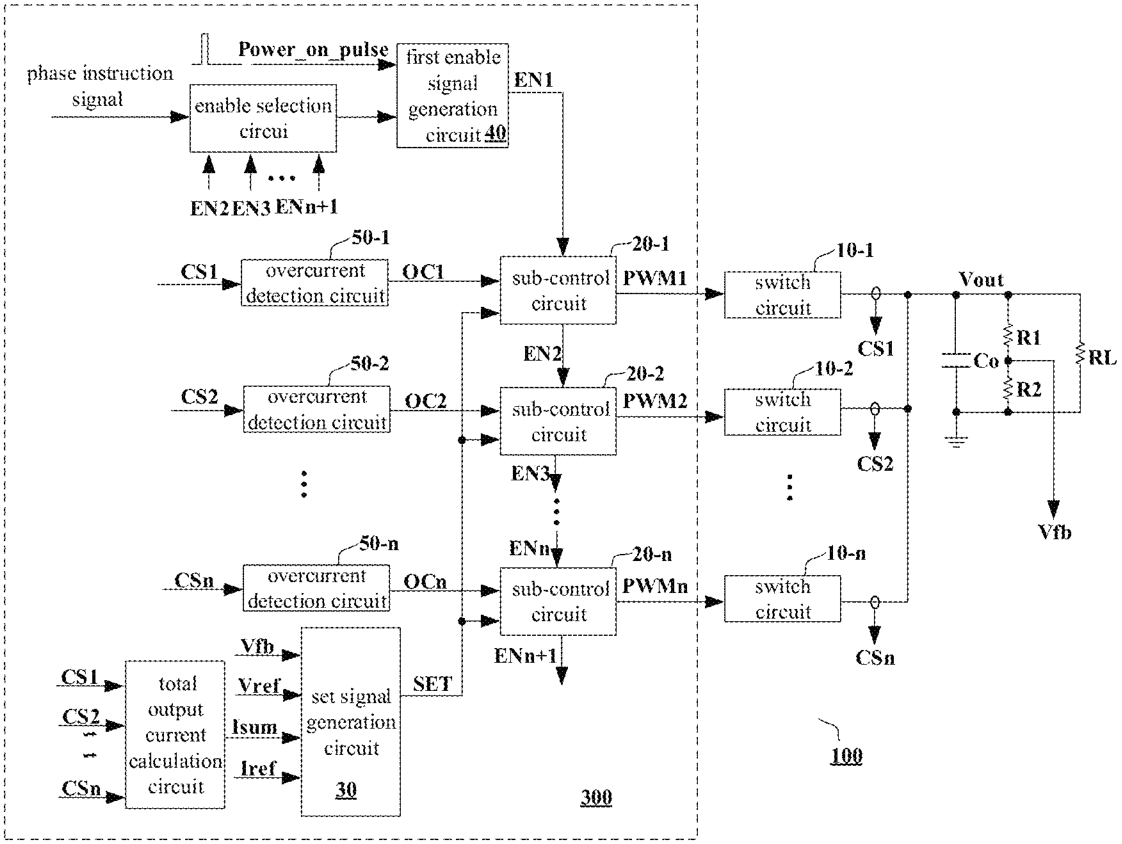
FIG. 3 shows a principle diagram of another multiphase power converter and the control circuit thereof provided by the present disclosure

FIG. 3 shows a principle diagram of another multi-phase power converter and control circuit thereof provided by the present disclosure. The difference from FIG. 1 is that its control circuit 300 is also equipped with an enable selection circuit, which can control the number of sub-control circuits and switch circuits that work according to the load situation. The enable selection circuit receives the phase command signals, where the phase command signals are generated by the control circuit according to the magnitude of the load current, which determines the number of switch circuits that need to be operated. The factor control circuit corresponds to the switch circuit, and the number can also be the number of sub-control circuits that need to be operated; the enable selection circuit also receives second enable signal EN2, third enable signal EN3, . . . the ENn+1th enable signal generated by the plurality of sub-control circuits; the output of the enable selection circuit acts on the input terminal of the first enable signal generation circuit 40; the first enable signal generation circuit 40 generates again the first enable signal EN1 for the enable terminal of the first sub-control circuit based on the received enable signal. For example, when the phase command signal requires m sub-control circuits to operate, where m is a positive integer greater than or equal to 1, then after the mth sub-control circuit outputs the m+1th enable signal ENm+1, the enable selection circuit selects the m+1th enable signal ENm+1 to act on the input terminal of the first enable signal generation circuit 40, causing it to generate the first enable signal EN1 again and start the next cycle of controlling the switch circuit to turn on sequentially. For sub-control circuits other than the 1st to m ones, conventional circuits can be used to disable them, or switch circuits other than the 1st to m ones can be disabled. The implementation circuit will not be described in detail here. Use the embodiment shown in FIG. 3, the number of required work phases can be controlled according to the load situation, to increase control flexibility.

Figure 4:
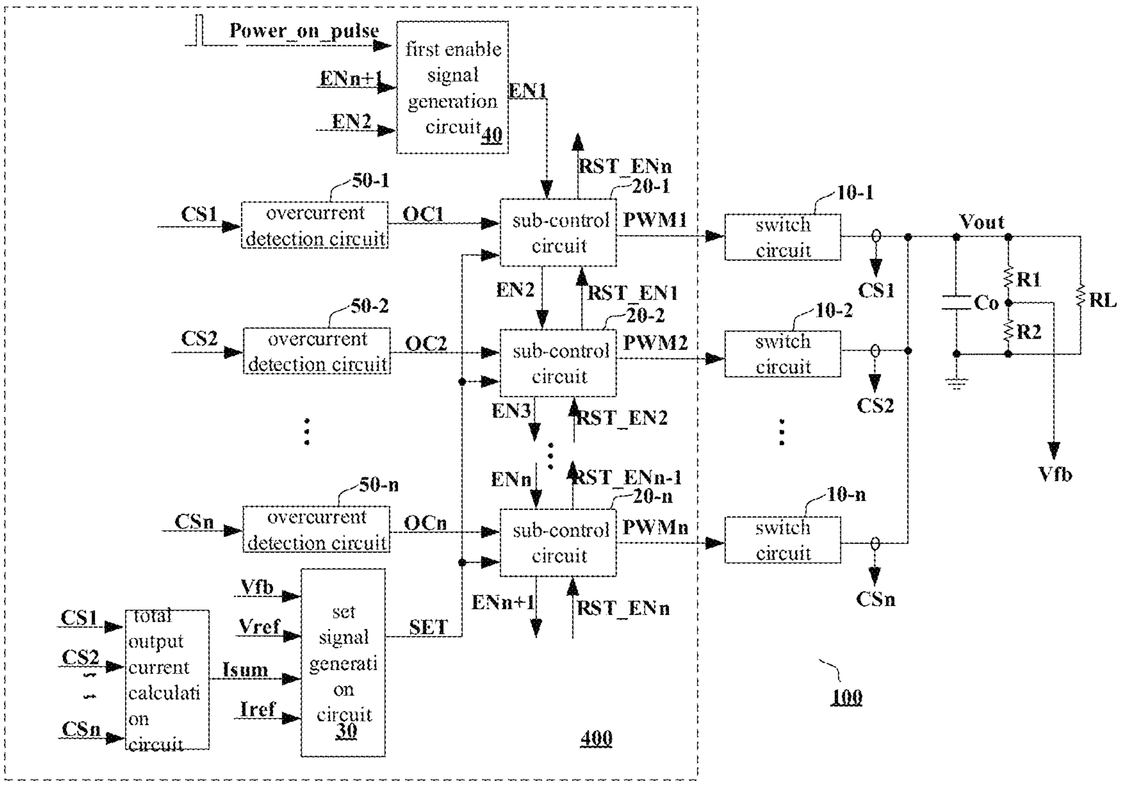
FIG. 4 shows a principle diagram of another multi-phase power converter and the control circuit thereof.

FIG. 4 shows a principle diagram of another multiphase power converter and its control circuit provided by the present disclosure. The difference between FIG. 1 and FIG. 3 lies in the setting of principle of the first enable signal generation circuit 40 and the signal transmission principle between sub-control circuits in the control circuit 400. At this time, the enable signals EN1, EN2 . . . ENn+1 may not be set as pulse signals. The principle will be explained below. The first enable signal generation circuit 40 generates an effective first enable signal EN1 based on the power on pulse or a signal generated based on the power on pulse. At this time, the first enable signal EN1 will be maintained at an effective level. After receiving the effective first enable signal EN1 and the effective set signal SET, the first sub-control circuit generates a second enable signal EN2 and a reset enable signal RST-INn, where the enable terminal of the second sub-control circuit receives the second enable signal EN2; the reset enable terminal of the last sub-control circuit receives the reset enable signal RST-INn. Wherein, the second enable signal EN2 also acts on the input terminal of the first enable signal generation circuit 40. After the first sub-control circuit generates an effective second enable signal EN2, the first enable signal generation circuit 40 resets it by generating an effective first enable signal EN1 based on the power on pulse or a signal generated based on the power on pulse. The second sub-control circuit generates a third enable signal EN3 based on the second enable signal EN2 and the set signal SET, which is applied to the enable signal terminal of its next sub-control circuit; and generates a reset enable signal RST-IN1 to act on the reset enable signal terminal of the first sub-control circuit, based on which the first sub-control circuit resets the second enable signal EN2 generated by it. The signal transmission relationship between adjacent sub-control circuits between the second and last sub-control circuits is also the same, and will not be elaborated in detail here. When the enable terminal of the last sub-control circuit receives the enable signal, it generates the enable signal ENn+1 based on the enable signal and the set signal, and generates the first enable signal EN1 again based on the enable signal ENn+1, and then starts the next switching cycle. Wherein, the last sub-control circuit generates a reset enable signal ENn+1 based on the reset enable signal RST-INn, which resets the first enable signal EN1.

Figure 5:
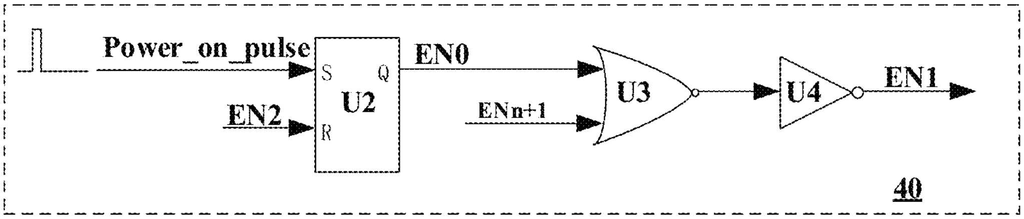
FIG. 5 shows a principle diagram of the first enable signal generation circuit provided by the present disclosure based on the principles in FIG. 4.

FIG. 5 shows a principle diagram of a first enable signal generation circuit 40 provided by an embodiment of the present disclosure based on the principle in FIG. 4, which comprises an SR flip-flop U2, a NOR gate U3, and a NOT gate U4; after the system is powered on, a power on pulse Power_on_pulse can be generated through the pulse generation circuit, and the circuit that generates the power on pulse can use prior art conventional circuits; this pulse acts on the set terminal of SR flip-flop U2, outputting a high-level initial enable signal EN0 at the output terminal. After passing through NOR gate U3 and NOT gate U4, the initial enable signal EN0 generates a high-level first enable signal EN1, which in turn causes the first sub-control circuit to generate a first switch control signal PWM1 based on the first enable signal EN1 and the set signal SET to control the switch circuit to turn on or off, as well as generating a second enable signal EN2 and a reset enable signal RST_ENn. Wherein, the present disclosure takes the example that the enable signal is in high level for explanation, but the present disclosure is not limited to this. Whether the enable signal is effective in high level or low level can be set according to the situation in practical applications. As shown in FIG. 5, the reset terminal of SR flip-flop U2 receives the second enable signal EN2, that is, reset the initial enable signal EN0 after the second enable signal EN2 is generated, so that the first enable signal EN1 is subsequently generated by the enable signal ENn+1. In addition, the present disclosure only illustrates one embodiment of the first enable signal generation circuit, and related modified embodiments of its equivalent functional embodiments are also within the protection scope of the present disclosure. FIG. 4 illustrates that the first enable signal generation circuit is entirely set outside the sub-control circuit. As other embodiments of the present disclosure, the first enable signal generation circuit can also be fully or partially set in the corresponding sub-control circuit.

Figure 6:
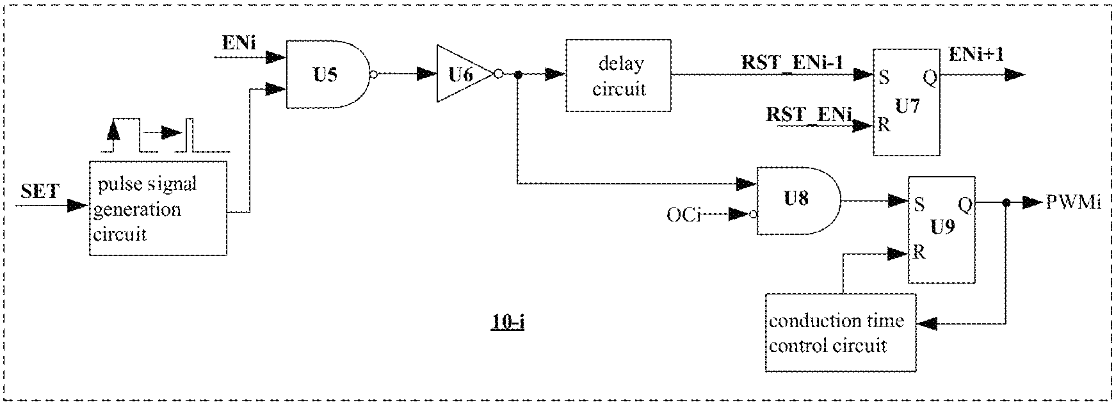
FIG. 6 shows a principle diagram of the ith sub-control circuit provided by the present disclosure based on the principles in FIG. 4.

FIG. 6 shows a principle diagram of an ith sub-control circuit provided by the present disclosure based on the principle in FIG. 4, wherein 1≤i≤n. The ith sub-control circuit receives an enable signal ENi, a set signal SET, and a reset enable signal RST-INi. When the control circuit comprises an overcurrent detection circuit, it also receives an overcurrent detection signal OCi; the ith sub-control circuit generates enable signal ENi+1 for the next sub-control circuit based on the received signal, switch control signal PWMi for controlling the ith switch circuit, and reset enable signal RST-INi−1 for the previous sub-control circuit. As shown in FIG. 6, the sub-control circuit comprises NAND gate U5, NOT gate U6, pulse signal generation circuit, delay circuit, AND gate U8, and SR flip flops U7 and U9. For those skilled in the art, it is known that in the multi-phase power converters, the set signal is a pulse signal. One input terminal of the NAND gate U5 receives the enable signal ENi, and the pulse signal generation circuit receives the set signal SET. When the rising edge of SET is detected, which is also the arrival of the pulse signal, a short pulse signal is output. This short pulse signal is applied to the other input terminal of the NAND gate U5. When the ith sub-control circuit simultaneously receives the effective enable signal ENi and the rising edge of the set signal SET, the delay circuit will receive a short pulse signal, which outputs the reset enable signal RST Eni−1 after the delay, and the reset enable signal RST_Eni−1 is applied on the set terminal of the SR flip-flop U7, and generates an enable signal ENi+1 at the output terminal of SR flip-flop U7. The received enable signal ENi and set signal SET are simultaneously applied to the input terminal of AND gate U8 through the pulse signal generation circuit, NAND gate U5, and NOT gate U6. The overcurrent detection signal OCi taken as being in high level indicates overcurrent in the corresponding switch circuit, and it is necessary to invert the level of the overcurrent detection signal OCi and connect it to the other input terminal of AND gate U8; the output terminal of AND gate U8 is connected to the set terminal of SR flip-flop U9. When a valid enable signal ENi is received and the total output circuit Isum is less than the reference current signal Iref, the set signal SET generated based on the voltage comparison signal VCMP is high. When the current flowing through the ith switch circuit is not overcurrent, that is, when OCi is in low level, high level is generated at the set terminal of SR flip-flop U9, and a high level switch control signal PWMi is output at the output terminal of SR flip-flop U9; here, the switch control signal is illustrated using the example that the switch circuit is controlled to turn on at high level; in other embodiments of the present disclosure, it may be that the switch circuit is controlled to turn on at low level, as long as the circuit is transformed accordingly. When the total output current Isum is greater than the reference current signal Iref, that is, when the total output current is overcurrent, according to the principle of generating the set signal SET in FIG. 2, at this time, the set signal SET is at a low level. Regardless of whether the enable signal ENi is at a high or low level, the set terminal of the SR trigger U9 is at a low level, which means that the ith switch circuit will not be turned on at this time; when the total output current Isum recovers to be less than the reference current signal Iref, the set signal SET can generate an effective switch control signal PWMi based on the voltage comparison signal VCMP being at high level and the overcurrent detection signal OCi being at low level (no corresponding switch circuit overcurrent detected), to control the ith switch circuit to turn on. When the overcurrent detection signal OCi is at high level, that is, when overcurrent flowing through the ith switch circuit is detected, the set terminal of SR flip-flop U9 is at a low level, and no effective switch control signal PWMi is generated. As shown in FIG. 6, the reset terminal of SR flip-flop U9 is connected to the conduction time control circuit, which is used to control the conduction time of the ith switch circuit. It receives the switch control signal PWMi and detects the conduction time of the ith switch circuit based on it. When its conduction time reaches the pre-set time of the conduction time control circuit, the reset terminal of SR flip-flop U9 generates high level, causing the switch control signal PWMi to reset, that is, controlling the ith switch circuit to turn off. In addition, FIG. 6 illustrates that the control circuit comprises an overcurrent detection circuit. As another embodiment of the present disclosure, an overcurrent detection circuit may not be provided. In this case, the switch control signal PWMi in the ith sub-control circuit is generated based on the enable signal ENi and the set signal SET, as long as the circuit is transformed accordingly. As one embodiment of the present disclosure, the conduction time control circuit may be a structure controlled by constant conduction time.

Figure 7:
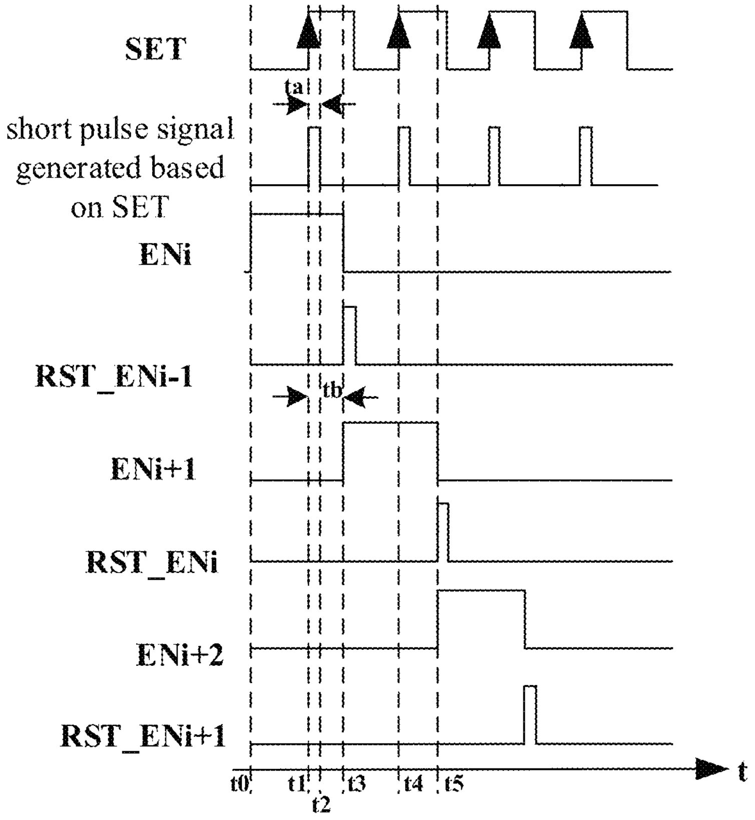
FIG. 7 shows a principle diagram for generating enabling signals and reset enabling signals according to the principles in FIG. 6 provided by the present disclosure.

FIG. 7 shows a principle diagram of sequentially generating the enable signal and the reset enable signal according to the principle in FIG. 6 provided in the present disclosure. At time t0, the enable signal ENi is at high level, ready to receive the set signal SET. At time t1, the set signal SET generates a high level pulse, and the pulse signal generation circuit generates a short pulse signal based on the rising edge of the set signal SET. The width of the short pulse signal is ta (duration between t1 and t2), and after the signal passes through the NAND gate U5, NOT gate U6, and delay circuit with the enable signal ENi, reset enable signal RST_Ini−1 is generated at time t3. The duration from t1 to t3 is tb, which is generated by the delay circuit, where tb is greater than ta; after the reset enable signal RST_INi−1 passes through the SR flip-flop U7, the enable signal ENi+1 is generated; at the same time, the reset enable signal RST_INi−1 is generated and applied to the previous sub-control circuit (i.e., the ith sub-control circuit), causing the enable signal ENi to reset. Similarly, after the next rising edge of SET arrives, the principle of generating the reset enable signal RST_ENi and enable signal ENi+2 together with the enable signal ENi+1 is the same. After the reset enable signal RST-INi is generated, it acts on the ith sub-control circuit, causing the enable signal ENi+1 to reset. The working principle of its subsequent sub-control circuit is the same as the above, and will not be elaborated in detail here.

Figure 8:
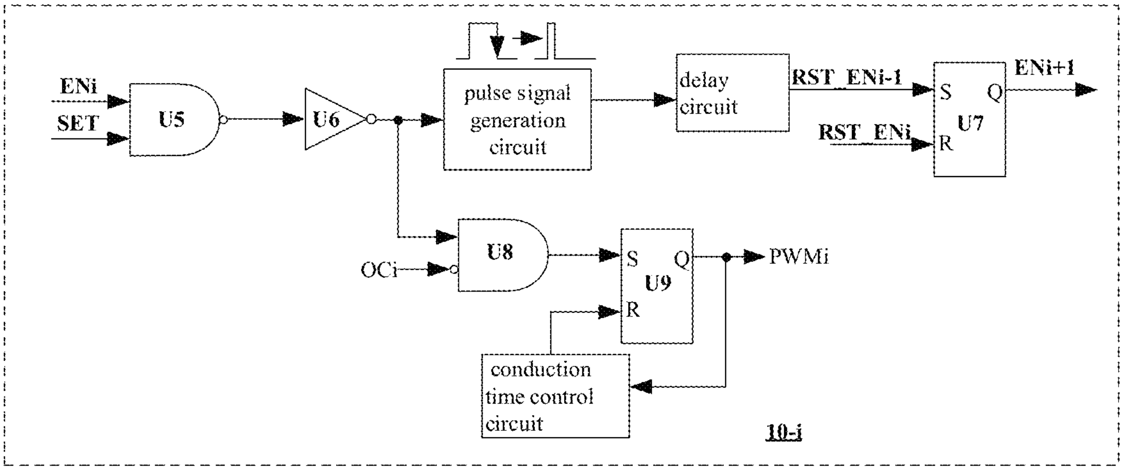
FIG. 8 shows a principle diagram of another ith sub-control circuit provided by the present disclosure based on the principles in FIG. 4.
Figure 9:
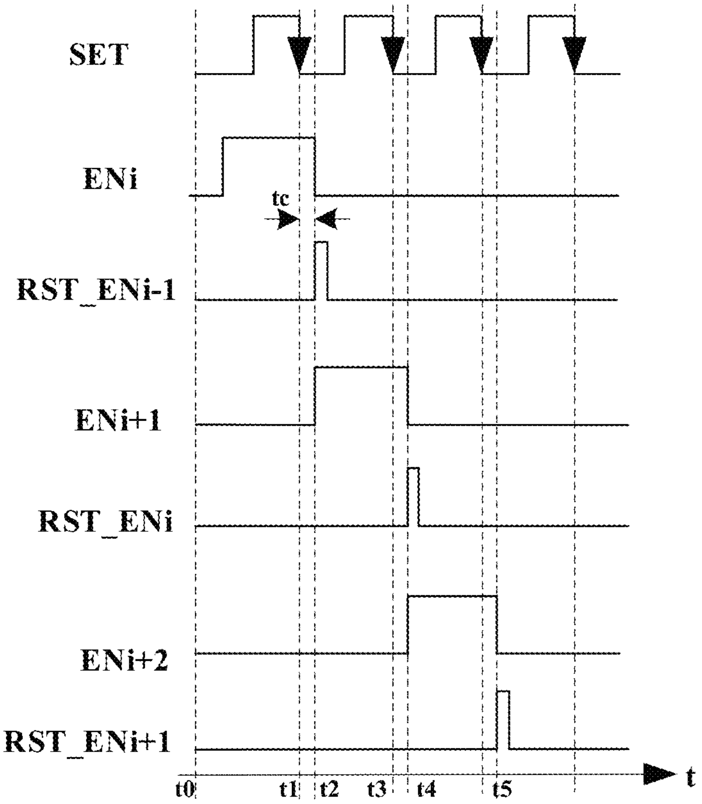
FIG. 9 shows a principle diagram for generating enabling signals and reset enabling signals according to the principles in FIG. 8 provided by the present disclosure.

FIG. 8 is a principle diagram of another ith sub-control circuit provided by the present disclosure based on the principle in FIG. 4. The difference from FIG. 6 is that the position setting the pulse signal generation circuit is different. The principle of generating the enable signal and reset enable signal will be explained below in conjunction with FIG. 9. The principle of generating the switch control signal PWMi can refer to the description in FIG. 6. In this embodiment, the pulse signal generation circuit generates a short pulse signal when it detects the falling edge of its received signal. After passing through the delay circuit, the short pulse signal generates a reset enable signal RST_INi−1 at the set terminal of the RS flip-flop U7, where the delay time is the duration between t1 and t2 in FIG. 9, i.e., tc; after the reset enable signal RST_INi−1 passes through the SR flip-flop U7, the enable signal ENi+1 is generated; at the same time, the reset enable signal RST_INi−1 is generated and applied to the previous sub-control circuit (i.e., the ith sub-control circuit), causing the enable signal ENi to reset. Similarly, the pulse signal generation circuit in the (i+1) th sub-control circuit detects the arrival of the next falling edge and generates a short pulse signal. After a delay, the short pulse signal generates the reset enable signal RST_INi and the enable signal ENi+2, and the principle is the same as above. After the reset enable signal RST_INi is generated, it acts on the i-th sub-control circuit to reset the enable signal ENi+1. The working principle of its subsequent sub-control circuit is the same as above, and will not be elaborated in detail here.

Figure 10:
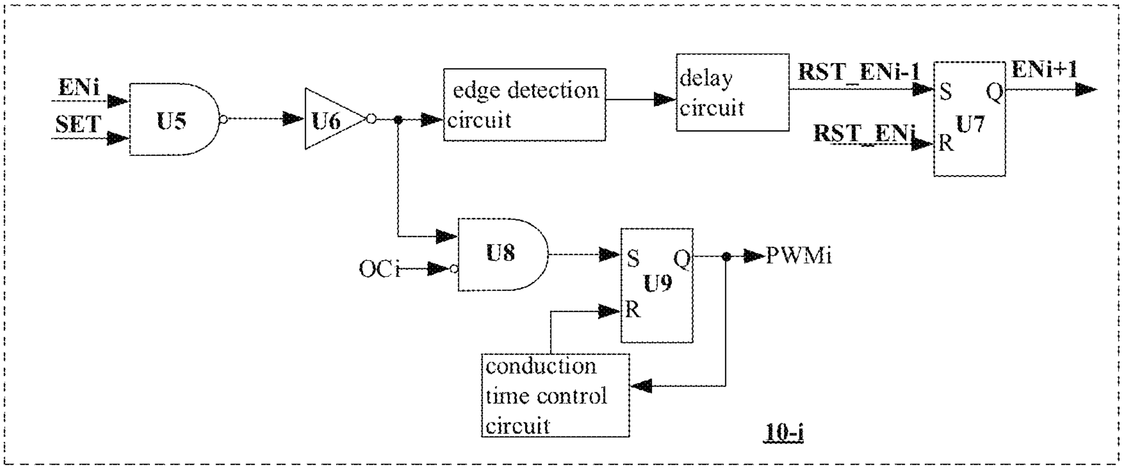
FIG. 10 shows a principle diagram of another ith sub-control circuit provided by the present disclosure based on the principles in FIG. 4.
Figure 11:
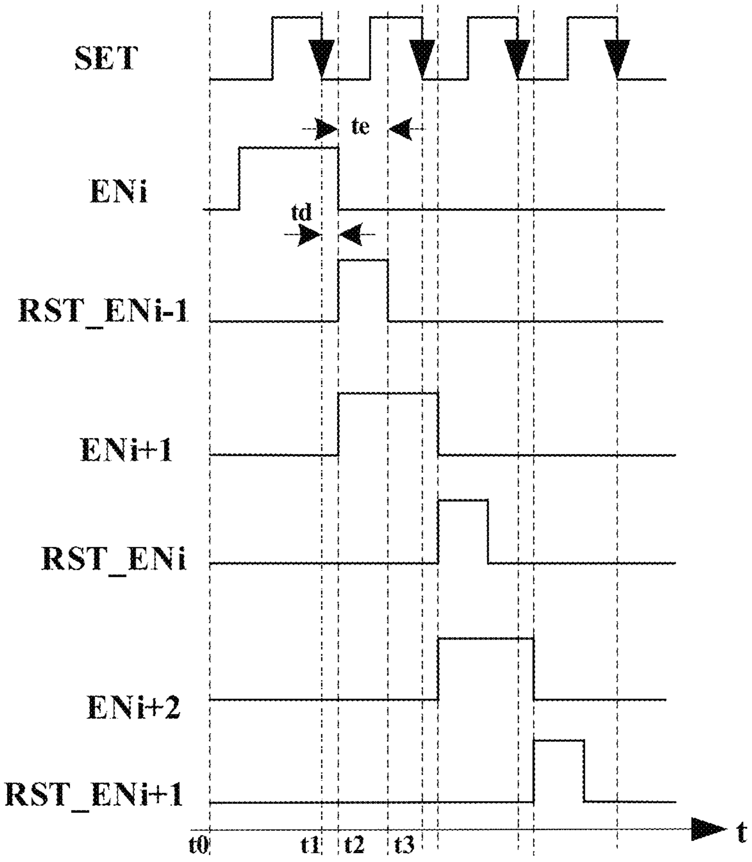
FIG. 11 shows a principle diagram for generating enabling signals and reset enabling signals according to the principles in FIG. 10 provided by the present disclosure.

FIG. 10 is a principle diagram of another ith sub-control circuit provided by the present disclosure based on the principle in FIG. 4. Unlike FIG. 6, it does not set a pulse signal generation circuit, but instead has an edge detection circuit. The principle of generating the enable signal and reset enable signal will be explained below in conjunction with FIG. 11, wherein the principle of generating the switch control signal PWMi can also refer to the description in FIG. 6. In this embodiment, after the enable signal ENi and the set signal SET are acted by the NAND gate U5 and NOT gate U6, the edge detection circuit detects the falling edge at time t1. As shown in FIG. 11, the pulse width of the enable signal ENi is greater than that of the set signal SET. Therefore, in FIG. 11, the falling edge of the set signal SET is used to represent this time. After passing through the delay circuit, the reset enable signal RST_INi−1 is generated at the set terminal of the RS flip-flop U7, where the delay time is the duration between t1 and t2 in FIG. 11, that is, td; after the reset enable signal RST-INi−1 passes through the SR flip-flop U7, the enable signal ENi+1 is generated; at the same time, the reset enable signal RST-INi−1 is generated and applied to the previous sub-control circuit (i.e., the i-th sub-control circuit), causing the enable signal ENi to reset. Among them, the duration between t2 and t3 is te, which is the time when both the enable signal and the set signal are high, that is, equal to the pulse width of the set signal SET. Similarly, the edge detection circuit in the (i+1) th sub-control circuit detects the arrival of the next falling edge and generates the reset enable signal RST-INi and enable signal ENi+2 through a delay circuit. The principle is the same as above. After the reset enable signal RST-INi is generated, it acts on the ith sub-control circuit, causing the enable signal ENi+1 to reset. The working principle of its subsequent sub-control circuit is the same as above, and will not be elaborated in detail here In addition, based on the principle of generating enable signals and reset enable signals, it can be seen that the settings of the delay circuits, edge detection circuits, and pulse signal generation circuits in FIGS. 6, 8, and 10 are only one embodiment of the present disclosure, as long as it can generate the pulse of the set signal acting on the next sub-control circuit as the next pulse for the set signal in the current sub-control circuit. Therefore, the working principle of the sub-control circuit of the present disclosure and the principle of generating corresponding enable signals and reset enable signals are not limited to the embodiments in FIGS. 6, 8, and 10. The number and position of the pulse signal generation circuits, delay circuits, edge detection circuits, and corresponding logic gate circuits can be adjusted according to actual situations. In addition, the specific delay duration can also be set as needed.

The present disclosure also provides a control method for a multiphase power converter, which comprises plurality of switch circuits. The output terminals of the plurality of switch circuits are connected together to provide an output voltage. The control method comprises: generating a voltage control signal based on the output voltage and a reference voltage signal; generating a current control signal based on the total output current of multiple switch circuits and the reference current signal; and generating a set signal based on the voltage control signal and current control signal; the plurality of sub-control circuits receive set signals; the enable terminal of the next sub-control circuit receives the enable signal generated by the previous sub-control circuit, and generates an enable signal for the enable terminal of the next sub-control circuit based on the enable signal and the set signal; each sub-control circuit generates a corresponding switch control signal based on its received enable signal and set signal to control the corresponding switch circuit to turn on or off.

Furthermore, when the sub-control circuit receives a valid enable signal and a valid set signal, it controls the switch circuit corresponding to the sub-control circuit to turn on; otherwise, the switch circuit corresponding to the sub-control circuit is controlled to remain turned off.

Furthermore, based on the power on pulse or the signal generated based on the power on pulse, the first enable signal generation circuit generates a first enable signal for the enable terminal of the first sub-control circuit, enabling the first sub-control circuit for the first time.

Furthermore, the control circuit also comprises an enable selection circuit which receives a phase instruction signal, which represents the number m of sub-control circuits or switch circuits that need to be operated, where m is a positive integer greater than or equal to 1; the phase instruction signal is generated by the control circuit based on the magnitude of the load current; the enable selection circuit receives the second enable signal . . . the (n+1) th enable signal generated by the first sub-control circuit . . . the nth sub-control circuit, respectively; wherein, the nth sub-control circuit is the last sub-control circuit, where n is a positive integer greater than or equal to 2; based on the phase instruction signal, the enable selection circuit selects the m+1th enable signal generated by the mth sub-control circuit and apply it to the input terminal of the first enable signal generation circuit, generating the first enable signal that enables the kth sub-control circuit; wherein, k is a positive integer not equal to 1, and m is a positive integer greater than or equal to 1; the control circuit controls the sub-control circuits or corresponding switch circuits other than the 1st to m sub-control circuits to not work.

Furthermore, the current sub-control circuit generates an enable signal for its next sub-control circuit based on the current pulse of the effective enable signal and set signal it receives; the next sub-control circuit of the current sub-control circuit generates an enable signal for its next sub-control circuit based on the effective enable signal and set signal it receives.

In addition, the control method may also comprise functions of the control circuit not mentioned above, which will not be elaborated further here.

As described above, the control circuit and control method of the multiphase power converter provided by the present disclosure generate a set signal based on the output voltage and reference voltage signal, the total output current, and the reference current signal, and each sub-control circuit receives the set signal; the next sub-control circuit receives the enable signal generated by its previous sub-control circuit, and generates corresponding switch control signals based on the received enable signal and set signal, as well as the enable signal applied to its next sub-control circuit, to control the corresponding switch circuit to turn on or off. The present disclosure achieves sequential conduction control of multiple switch circuits through signal transmission between multiple sub-control circuits. When the total output current is overcurrent, overcurrent protection can be implemented. When the total output current is not overcurrent, control of the switch circuit can be achieved based on the ratio of the output voltage to the reference voltage signal, thus increasing system stability.

Furthermore, the present disclosure also provides an enable selection circuit that can control the number of sub-control circuits or switch circuits that operate based on the phase number command signal according to the load situation, thereby enhancing the flexibility of control.

Furthermore, when multiple overcurrent detection circuits are also set simultaneously, the plurality of overcurrent detection circuits correspond one-to-one with the plurality of switch circuits; when overcurrent is detected in the corresponding switch circuit, control the corresponding switch circuit to remain turned off. The present disclosure further improves the reliability of the system by setting an overcurrent detection circuit for each switch circuit by such setting.

Finally, it should be noted that the above embodiments are only examples provided to clearly illustrate the present disclosure, and are not limitations on the implementation methods. For those of ordinary skill in the art, other different forms of changes or modifications can be made based on the above explanation. It is not necessary and impossible to exhaustively list all implementation methods here. The obvious changes or variations derived from this are still within the protection scope of the present disclosure.

What is claimed is:

1. A control circuit of a multiphase power converter, wherein the multiphase power converter comprises a plurality of switch circuits, and output terminals of the plurality of switch circuits are connected to provide an output voltage, the control circuit comprises:

a set signal generation circuit, generating a voltage control signal based on the output voltage and a reference voltage signal; generating a current control signal based on a total output current and a reference current signal of the plurality of switch circuits; and generating a set signal based on the voltage control signal and the current control signal;

a plurality of sub-control circuits, each of the plurality of sub-control circuits receives the set signal;

an enable terminal of a next sub-control circuit receives an enable signal generated by a previous sub-control circuit, and generates the enable signal for the enable terminal of an after next sub-control circuit based on the enable signal and the set signal;

each sub-control circuit generates a corresponding switch control signal based on the enable signal and the set signal that are received, to control a corresponding switch circuit to be on or off, wherein the control circuit further comprises a first enable signal generation circuit, which generates a first enable signal for an enable terminal of a first sub-control circuit, enabling the first sub-control circuit for a first time based on a power on pulse or a signal generated based on the power on pulse.

2. The control circuit of claim 1, wherein, when a sub-control circuit receives a valid enable signal and a valid set signal, the switch circuit corresponding to the sub-control circuit is controlled to be on; otherwise, the switch circuit corresponding to the sub-control circuit is controlled to remain off.

3. The control circuit of claim 1, wherein, the control circuit further comprises an enable selection circuit, which receives a phase instruction signal representing the number m of sub-control circuits or switch circuits that need to be operated, where m is a positive integer greater than or equal to 1; the phase instruction signal is generated by the control circuit based on a magnitude of the load current;

the enable selection circuit receives a second enable signal to n+1th enable signal generated by the first sub-control circuit to nth sub-control circuit, respectively; wherein, the nth sub-control circuit is a last sub-control circuit, where n is a positive integer greater than or equal to 2;

based on the phase instruction signal, the enable selection circuit selects the m+1th enable signal generated by the mth sub-control circuit for the input terminal of the first enable signal generation circuit, generating the first enable signal that enables the kth sub-control circuit; wherein, k is a positive integer not equal to 1, and m is a positive integer greater than or equal to 1;

the control circuit controls the sub-control circuits or corresponding switch circuits other than the 1st to m sub-control circuits to not work.

4. The control circuit of claim 1, wherein:

a last sub-control circuit generates an enable signal for the input terminal of the first enable signal generation circuit based on the set signal and the enable signal generated by the previous sub-control circuit; the first enable signal generation circuit generates an enable signal for the kth enable of the first sub-control circuit based on the effective enable signal; wherein k is a positive integer not equal to 1.

5. The control circuit of claim 4, wherein, when each sub-control circuit generates a valid enable signal and the corresponding enable signal is not a short pulse signal, the next sub-control circuit generates a reset enable signal for the reset enable terminal of its previous sub-control circuit based on the enable signal and the set signal generated by its previous sub-control circuit; the previous sub-control circuit resets the enable signal generated by the previous sub-control circuit based on the received valid reset enable signal;

the first enable signal generation circuit also receives the second enable signal generated by the first sub-control circuit; when the first enable signal generation circuit receives a valid second enable signal, it resets the first enable signal generated for the first time;

the reset enable terminal of the last sub-control circuit receives the reset enable signal generated by the first sub-control circuit; when the last sub-control circuit receives a valid reset enable signal, reset the kth generated first enable signal.

6. The control circuit of claim 1, wherein, the control circuit further comprises a plurality of overcurrent detection circuits, each of which detects whether the corresponding switch circuit is overcurrent based on a current detection signal flowing through the corresponding switch circuit;

each sub-control circuit is respectively coupled to an output terminal of the corresponding overcurrent detection circuit; when overcurrent is detected in the corresponding switch circuit, the corresponding switch circuit is controlled to remain off.

7. The control circuit of claim 1, wherein, a current sub-control circuit generates an enable signal for its next sub-control circuit based on a valid enable signal that is received and a current pulse of the set signal;

the next sub-control circuit of the current sub-control circuit generates an enable signal for its next sub-control circuit based on the received effective enable signal and the next pulse of the set signal.

8. The control circuit of claim 1, wherein, each of the plurality of sub-control circuits comprises a conduction time control circuit for controlling a conduction duration of the corresponding switch control circuit.

9. A multiphase power converter, comprising the control circuit of claim 1.

10. A control method of a multiphase power converter, wherein the multiphase power converter comprises plurality of switch circuits; output terminals of the plurality of switch circuits are connected to provide an output voltage, the control method comprises:

generating a voltage control signal based on the output voltage and reference voltage signal; generating a current control signal based on a total output current of the plurality of switch circuits and a reference current signal; and generating a set signal based on the voltage control signal and the current control signal;

receiving a set signal by a plurality of sub-control circuits;

an enable terminal of a next sub-control circuit receives an enable signal generated by a previous sub-control circuit, and generates an enable signal for an enable terminal of an after next sub-control circuit based on the enable signal and the set signal;

each sub-control circuit generates a corresponding switch control signal based on the enable signal and the set signal that are received, to control a corresponding switch circuit to be on or off, wherein based on a power on pulse or a signal generated based on the power on pulse, generating a first enable signal for the enable terminal of a first sub-control circuit by a first enable signal generation circuit, enabling the first sub-control circuit to enable for a first time.

11. The control method of claim 10, wherein, when a sub-control circuit receives a valid enable signal and a valid set signal, controlling the switch circuit corresponding to the sub-control circuit to be on; otherwise, controlling the switch circuit corresponding to the sub-control circuit to remain off.

12. The control method of claim 10, wherein, the control circuit further comprises an enable selection circuit, which receives a phase instruction signal representing a number m of the sub-control circuits or switch circuits that need to operate, where m is a positive integer greater than or equal to 1; the phase instruction signal is generated by the control circuit based on a magnitude of the load current;

the enable selection circuit receives a second enable signal to an n+1th enable signal generated by the first sub-control circuit to an nth sub-control circuit, respectively; wherein, the nth sub-control circuit is a last sub-control circuit, where n is a positive integer greater than or equal to 2;

based on the phase instruction signal, the enable selection circuit selects an m+1th enable signal generated by an mth sub-control circuit for the input terminal of a first enable signal generation circuit, generates the first enable signal that enables a kth sub-control circuit; wherein, k is a positive integer not equal to 1, and m is a positive integer greater than or equal to 1;

the control circuit controls the plurality of sub-control circuits or corresponding switch circuits other than the 1st to mth sub-control circuits to not work.

13. The control method of claim 10, wherein, a current sub-control circuit generates an enable signal for its next sub-control circuit based on an effective enable signal it receives and a current pulse of the set signal;

a next sub-control circuit of the current sub-control circuit generates an enable signal for its next sub-control circuit based on a received effective enable signal and a next pulse of the set signal.

* * * * *